United States Patent [19]

Schumacher

[11] Patent Number: 4,503,627

[45] Date of Patent: Mar. 12, 1985

[54] APPARATUS FOR THE TREATMENT OF FLAKY OR GRANULATED MATERIAL WITH GASES OR VAPORS IN A CONTINUOUS COUNTERCURRENT PROCESS

[76] Inventor: Heinz O. Schumacher, Höperfeld 26, D-2050 Hamburg 80, Fed. Rep. of Germany

[21] Appl. No.: 399,995

[22] Filed: Jul. 20, 1982

[30] Foreign Application Priority Data

Jul. 20, 1981 [DE] Fed. Rep. of Germany ....... 3128596

[51] Int. Cl.³ ............................................. F26B 17/18
[52] U.S. Cl. ........................................ 34/173; 34/171; 99/483; 432/131; 432/132
[58] Field of Search .......................... 34/172, 173, 171; 432/131, 139, 132; 110/247; 99/483, 485; 426/466, 465

[56] References Cited

U.S. PATENT DOCUMENTS

| | | | |
|---|---|---|---|
| 832,874 | 10/1906 | McElroy | 34/173 |
| 2,585,793 | 2/1952 | Kruse | 99/98 |
| 2,695,459 | 11/1954 | Hutchins | 34/17 |
| 2,776,894 | 1/1957 | Kruse | 99/98 |
| 2,806,297 | 9/1957 | Hutchins | 34/173 |
| 3,126,285 | 3/1964 | Lippold | 99/98 |
| 4,380,127 | 4/1983 | Roberts | 34/211 |

FOREIGN PATENT DOCUMENTS

| | | |
|---|---|---|
| 1133969 | 7/1962 | Fed. Rep. of Germany . |
| 2608712 | 1/1977 | Fed. Rep. of Germany . |
| 875165 | 8/1961 | United Kingdom ................. 34/173 |

OTHER PUBLICATIONS

Journal "Fette-Seifen-Anstrichmittel", (1976), No. 2, pp. 56–59, Der Desolventizer-Toaster-Trockner-Kühler (TTK), ein neues Verfahren bei der Verarbeitung von Ölsaaten, by H. Schumacher.

*Primary Examiner*—Larry I. Schwartz
*Attorney, Agent, or Firm*—Bachman and LaPointe

[57] ABSTRACT

The invention relates to apparatus for gentle thermal treatment of flaky or granulated material with vapors in continuous operation, wherein the vapors are introduced from the bottom and conducted in countercurrent to the material falling downwardly by gravity and by the aid of additional mechanical means through one treatment stage or a plurality of treatment stages, the individual treatment stages being defined by perforated plates to which the material to be treated is fed by horizontal motion, the space below the lowermost, unheated perforated plate serving to distribute the gases or vapors and to admit the latter uniformly to the entire treatment space, the bores of the openings or perforations in the plates having a cross-section which allows the vapors, but not the material being treated, to pass therethrough, in order, on the one hand, to achieve optimum vapor exploitation and, on the other hand, to prevent any damage to the material being treated (FIG. 1).

20 Claims, 9 Drawing Figures

APPARATUS FOR THE TREATMENT OF FLAKY OR GRANULATED MATERIAL WITH GASES OR VAPORS IN A CONTINUOUS COUNTERCURRENT PROCESS

The present invention relates to apparatus for gentle thermal treatment of materials sensitive to heat, particularly of flaky or granulated natural substances of vegetable origin, wherein the material is exposed, in a continuous process, to a gaseous or vaporous medium in countercurrent.

Processes which are conducted in such apparatus serve e.g. for drying agricultural products, seeds, feeding stuffs, vegetable food products, sensitive chemical raw and final products etc. by the action of hot air or other suitable media adapted to carry away the moisture of the material.

Of special importance in this connection and of particular relevance in the present case are such processes where it is intended to remove from the material being treated, beside moisture, also remains of solvent or, in the specific case, such remains only, as are obtained in the remaining extraction residue, e.g. in the extraction of seeds or coarsely crushed material in the oil milling industry.

It is well known that in recent times, in all parts of the world, considerable quantities of oil seeds, particularly soybean, rape seed, nut and kernel material etc. were treated with predominantly low-boiling hydrocarbons (benzene, hexane, propane etc.) or with mixed solvents, such as mixtures of hydrocarbons as mentioned above with alcohols, ketones (acetone) or, quite generally, polar solvents or, possibly, also water, so as to extract the oils and fats contained therein, and, thereafter, the miscella consisting of extractant and oils and fats dissolved therein was separated from the residue (e.g. oil cake).

The residue of extraction, which still contains considerable proportions of solvent in spite of the good separating effect obtained with respective devices (presses etc.), must be freed from these solvent remains before being processed to feeding stuffs and food products (flakes, granulated material, meal etc.). Suitable processes and apparatus for that purpose are known. They are offered by the respective industry under the designations of drier, desolventizer, steamer or toaster in many designs being more or less efficient. In this, the extraction residue is freed to a large extent of the extractant adhering thereto, in predominantly continuous operation, by means of hot air, steam or other suitable flowable media and, at the same time, the extractant is recovered more or less effectively.

One known "toaster" of this kind, which is used world-wide, i.e. a toaster based on the principle of countercurrent action of hot, gaseous media on the solvent-wet residue of extraction is described, for example, in the journal "Fette-Seifen-Anstrichmittel" (1976), No. 2, pages 56 et seq. ("Desolventizer-Toaster-Trockner-Kühler").

With this apparatus, the material to be treated is continuously introduced into a closed vessel of one-compartment or multi-compartment design through a sluice or valve and moved or agitated on the bottoms of the respective compartments by multiarm rabble means secured on a central agitator shaft. The material thereby passes in continuous flow from compartment to compartment after a predetermined period of time until it finally leaves the vessel through a suitable discharge means at the lower bottom of the vessel.

During this process the vessel is supplied from below with the gaseous treating medium, such as hot air or steam, through a suitable sieve plate or perforated bottom or a distributor. The treating medium streams through the downwardly moving material and while doing so carries off the moisture and/or the solvent adhering to the material. The various compartments or stages of the apparatus are interconnected by controllable valves through which the material gets into the next lower stage or compartment. The height of the layer of material on the compartment bottom or the individual compartment bottoms, and thereby the sojourn time of the material in the vessel, can be adjusted by an infinitely variable control of the rate of revolution of the discharge means, particularly the discharge means at the lower terminal bottom.

Multistage apparatus or systems of this type serve also for simultaneous drying and cooling of the material which is desolventized particularly in the uppermost stage or compartment (with steam), the drying being effected in the intermediate stage with hot air, and the cooling being effected in the lowermost stage with cold air.

Especially in the mere desolventizing, toasting or demoisturizing of benzene- or hexane-containing oil cake, such as soybean oil cake, etc. of meal-like or coarsely crushed consistency, it is necessary for reasons of preventing explosive mixtures, in connection with optimum recovery of the highly volatile solvent—which is subsequently reused—, to carry out the treatment of the material with pure steam.

The U.S. Pat. No. 2,585,793 describes a so-called toaster developed especially for soybean flakes wherein the drying or desolventizing is effected in the upper region of a multistage system similar to that in "Fette-Seifen-Anstrichmittel" l.c., by feeding in of live steam, In this apparatus, the individual bottoms may be in the form of double bottoms which are possibly themselves fed with superheated steam and thereby maintained at ambient temperature. Also, the vessel itself is equipped with a steam jacket which serves the same purpose.

Of similar construction is also an apparatus known from U.S. Pat. No. 2,776,894 wherein, however, the uppermost bottom, in addition to being heated by steam, is provided with openings in the top plate of the stage defining closure means being in the form of a double bottom, said openings permitting the passage of steam therethrough, so that the material introduced into the vessel—in the uppermost stage—is directly exposed to the steam.

German Pat. No. 2,608,712 relates to a system serving the same purpose wherein live steam is introduced into the vessel through the lowermost steam distributor constructed as a perforated bottom or sieve bottom and streams upwardly through likewise perforated stage or compartment bottoms in opposition to the material over the entire height of the vessel. Additionally, each stage or compartment can itself be supplied with steam through further steam inlets, whereby super-saturation of the live steam introduced from below or condensation of that steam in the upper part of the vessel is prevented. Also, the additional feeding in of steam into the individual stages makes it possible to maintain or adjust a temperature gradient within the whole system.

The last-mentioned system or apparatus attains a specially effective uniform admission of steam which is due especially also to the throughgoing perforation of all bottoms including the bottoms between the different stages or compartments. This provides for optimal gentle treatment of the material and the explusion of solvent is considerably improved, with simultaneous considerable improvement of economical conditions, particularly with regard to steam consumption and recovery of solvent.

However, it has been found that the openings or perforations in the individual compartment bottoms, though being adapted by special design (rounded edges in the direction of the steam passing therethrough) to counteract congestion by particles of material getting into the openings and to produce a certain spraying effect of the steam, occasionally have the effect that water vapor condensates on the bottoms, thereby causing temperature variations or deviations, which in turn requires increased amounts of steam and steam pressures, and occasionally also results in disturbance of the free flow of the material being moved by the rabble arms.

Although the system referred to above favourably differs from all earlier systems of this kind in that the formation of channels of steam through parts of the material and consequent incomplete drying (desolventizing), which is a characteristic of said earlier systems, is largely avoided, if not prevented altogether, the system referred to, as a whole, was still capable of considerable improvement.

With regard to the prior art, reference is finally also made to German Pat. No. 1,133,969 the apparatus of which shows hollow bottoms centrically provided about the centrically disposed vertical rotary shaft, said bottoms filling or occupying only a portion, preferably only about one half, of the cross-section of the apparatus and being adapted to have steam admitted thereto.

With this prior arrangement it is provided that the middle or intermediate bottom assembly includes a plate having upwardly open perforations through which additional steam may be fed in while the principal amount of steam is introduced directly into the individual chambers (stages, compartments) through lateral connection pieces.

It is extremely doubtful whether this system is capable of providing uniform contact of the steam with the material to be treated because, on the one hand, the relatively wide marginal zones where no bottom is provided promote the formation of steam channels or passageways, the various ways of feeding in the steam (on the one hand through the perforation of the middle or intermediate bottom and on the other hand through the connection pieces in the wall of the vessel) result in disturbing turbulence and, finally, there are observed local steam velocities which rupture the material and allow the steam to blow through without any effect.

In the course of the further development of apparatus of the type described hereinbefore it has been found that the problem of controlled steam distribution, the prevention of channel formation with rupturing of material, the hazard of localized overheating of the material, disturbances by steam condensation on or in the region of the stage or compartment bottoms etc. can be overcome and, at the same time, improved efficiency and yield in regard to energy and material (steam consumption, throughput of material per unit of time, quality of material) can be obtained, if the compartment bottom or the individual compartment bottoms, with the exception of the lowermost bottom, which acts as the steam distributor bottom, are both, permeable to steam and capable of being directly heated by steam (or possibly by another system).

The overall structure of such apparatus, as known e.g. from German Pat. No. 2,608,712, is not changed thereby in essential elements. The apparatus according to the invention also has a central agitator system including rabble arms being moved over the compartment bottoms, the material to be treated moves from bottom to bottom (any desired number of bottoms may be provided and there may even be only one bottom), passes on to the next lower bottom via so-called aprons (cf. "Fette-Seifen-Anstrichmittel" l.c., particularly page 57, FIG. 2), is engaged and treated by live steam in the individual stages and, finally, at the lowermost end of the apparatus, gets to the outlet.

The subject matter of the application thus is an apparatus for gentle thermal treatment of materials sensitive to heat, particularly flaky or granulated natural substances of vegetable origin, with flowable media, such as gases or vapors, in countercurrent, wherein the flowable medium is conducted in opposition to the material falling downwardly by gravity through one treatment stage or several treatment stages, the individual treatment stages being defined by sieve plates or perforated plates having suitable overflow or discharge means, agitator or rabble arms secured to a central agitator shaft being moved slightly above said perforated plates, the space below the lowermost perforated plate (lowermost stage closure) serving to distribute the flowable medium, characterized in that the perforated or sieve bottoms defining the lower boundary of the treatment stages or compartments are constructed as bottoms, espec. double bottoms, which are adapted to have live steam admitted thereto and the apertures or bores of which are formed by individual distance pieces or spacers each having a bore therethrough—the geometrical shape thereof being variable depending on the process conditions—, while the lowermost perforated or sieve bottom serving to distribute the steam is an unheated or heated plate.

Further developments of the apparatus according to the invention may be learnt from the subclaims in connection with the drawings and the description.

In the following, the apparatus will be described in its general and detailed structure by reference to FIGS. 1 to 5, wherein FIG. 1 is a schematic representation of an apparatus according to the present invention in which self-evident elements, such as driving means, measuring and controlling means etc. have been omitted;

FIGS. 4a–d and 5a and b show further possibilities of constructing the spacers having bores, in accordance with the present invention.

Figure 1:
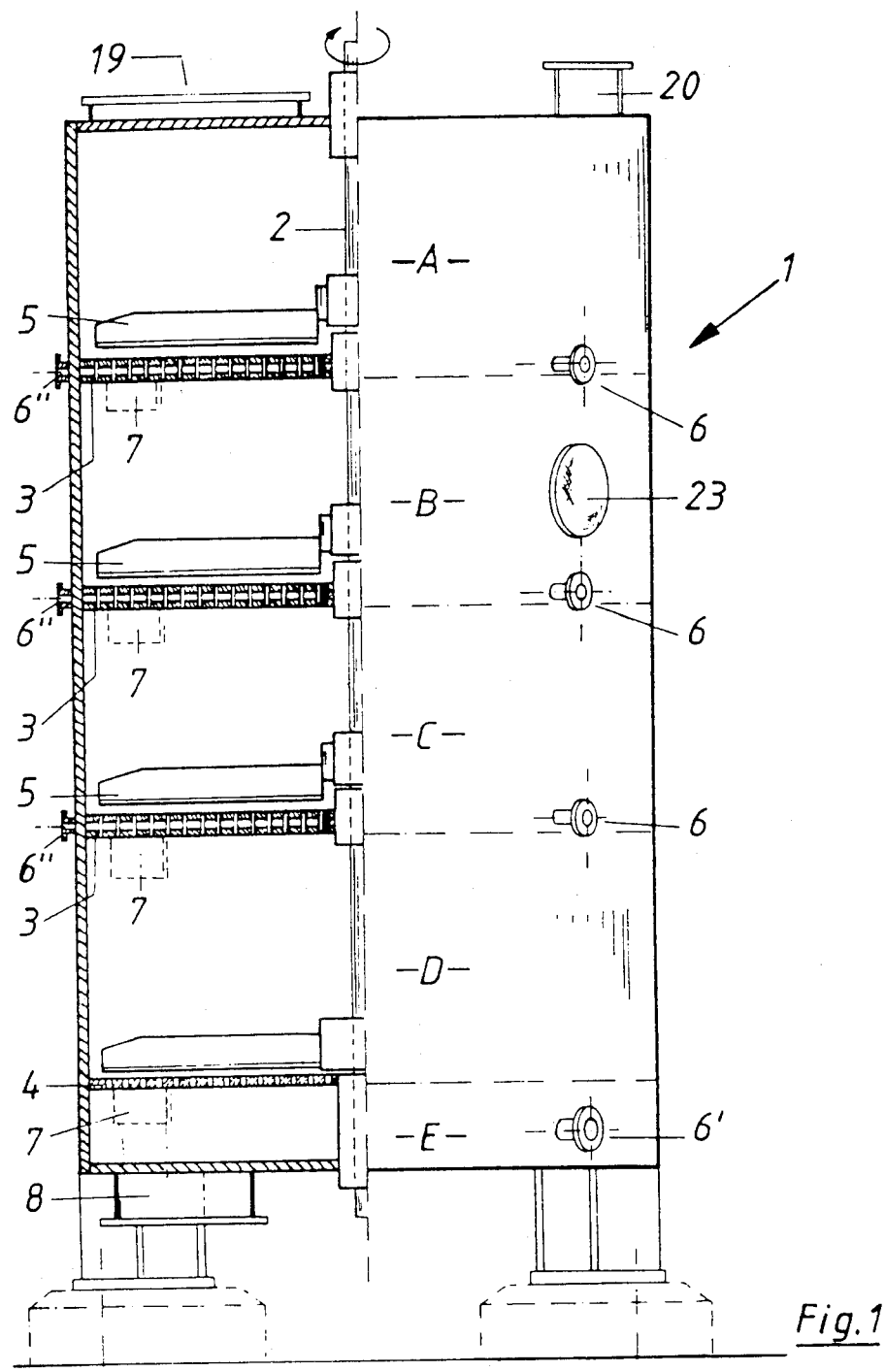

According to FIG. 1, the apparatus consists of the particularly cylindrical chamber (1) with a centrically inserted rotary shaft (2) which serves for effecting horizontal movement of a number of agitator or rabble arms (5). The latter move, respectively, over the stage or compartment bottoms (3) and the steam distributor bottom (4) at the lower end of the chamber (1) at a slight distance from said bottoms, and the material, which is introduced into the chamber (1) by way of suitable dosing means (sluice, bucket wheel, worm, etc.) at (19), is thereby maintained in adequate, mixing motion, keeping the material as loose as possible.

The material gets through suitable discharge means (7)—which are only suggested—from stage to stage (A through E) (of which there may be provided only one (A or B or C or D), depending on the operating conditions) while, simultaneously, the gaseous or vaporous treating agent introduced through the connecting piece (6') and distributed through the lowermost bottom (4) streams in opposition to the material.

In most applications of the apparatus, the treating agent used is steam; therefore, the gaseous or vaporous treating agent will be referred to hereinafter quite generally by this term.

The bottom (4) is provided with holes or perforations uniformly distributed over its entire area so as to ensure a likewise uniform distribution of the incoming steam. The bottom (4) is not heated.

The steam subsequently passes from the lower treatment zone (D), through a double bottom (3) according to the present invention, into the next higher compartment or treatment zone (C), the compartment (B), the compartment (A), etc. and leaves the apparatus—now laden with solvent—through the outlet pipe connection (20).

Figure 2:
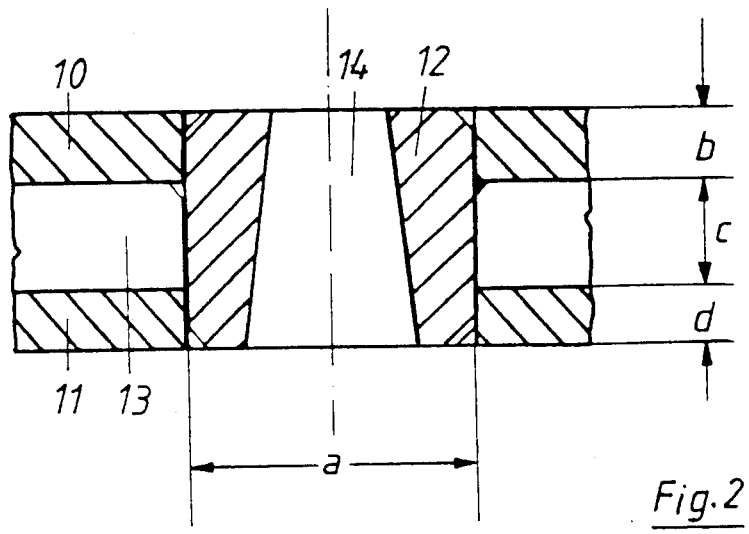
FIG. 2 shows a preferred form of construction of the spacers having bores therethrough, with indication of usual dimensions.

As is further shown in FIG. 1, the double bottoms (3) between the compartments or stages (A,B,C) or as closure to the compartment or stage (C), are provided with live-steam connections (6), so that the interior spaces of the double bottoms—cf. FIG. 2, item (13)—can be adjusted to the required process temperature. It is understood that each individual bottom (3) may have steam admitted thereto separately or may be connected to a common steam conduit. Usual connection pieces for the discharge of condensate (6") are provided in known manner. Sight glasses (23) are installed at the level of the individual treatment zones or the bottoms to observe the flow of the material being treated, the steam bubbling motion through the perforated bottoms and the level of the material in the zones. The material having reached the lowermost compartment (E), i.e. the final product, leaves the apparatus by way of the connection piece (8), which is preferably also formed as a discharge means (sluice etc.).

Figure 3:
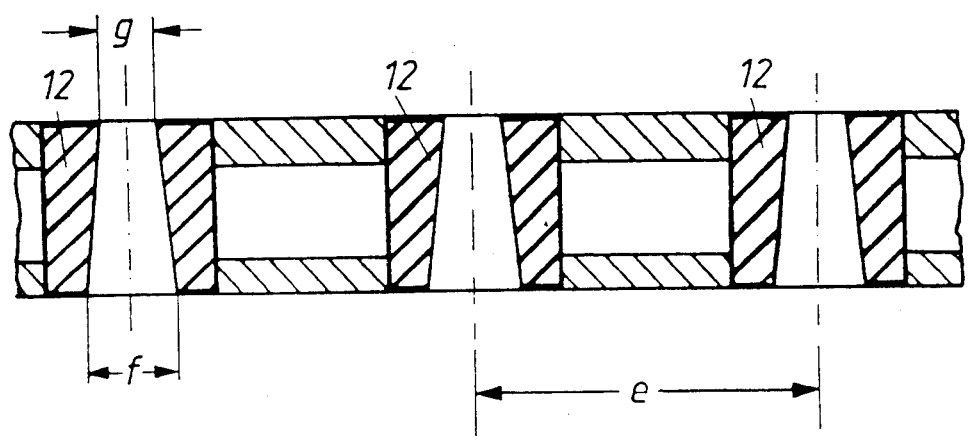
FIG. 3 shows a plurality of spacers arranged side-by-side and their distance relation to one another.

As is shown by FIGS. 2 and 3, the partition bottoms between the stages (A through D) each comprise two bottom plates (10, 11) enclosing a steam space (13) therebetween. This steam space is supplied with live steam (item (6) in FIG. 1). According to the invention, so-called spacers or distance pieces (12) are inserted into the holes formed in the plates (10, 11) by bores, the plates (10, 11) being connected with each other and held by said spacers (12). The spacers (12) fill the free space of each borehole in the plates (10, 11). A steam-tight closure or seal is formed between the steam space (13) and the holes in the plates by welding the spacers (12) to the plates (10, 11) at both ends.

The spacers (12) themselves also have bores (14) therethrough; said bores (14) preferably have the configuration according to FIGS. 2 and 3, that means, they taper conically from the lower end—at the lower bottom plate (11)—to the upper end—at the upper bottom plate (10).

This preferred configuration is of advantage whenever the live steam coming from the lowermost distributor plate (4) is to be used also as dry steam for materials containing water—i.e. materials which, besides containing solvent moisture, also contain water moisture—and where it is necessary to prevent any condensation of steam on the bottoms. By the form of the spacers according to FIGS. 2 and 3, the steam when issuing from the bores (14) is imparted additional tension, which results in a specially pronounced bubble action of the steam and consequent whirling motion throughout the material being treated.

Further favorable developments of the spacers are shown by FIGS. 4a through 4d and 5a and 5b, these developments being, however, subject to the respective process conditions (feedstock, temperature range, sojourn time, degree of wetness or moisture content, stability of material, grain size, etc.).

Figure 4A:
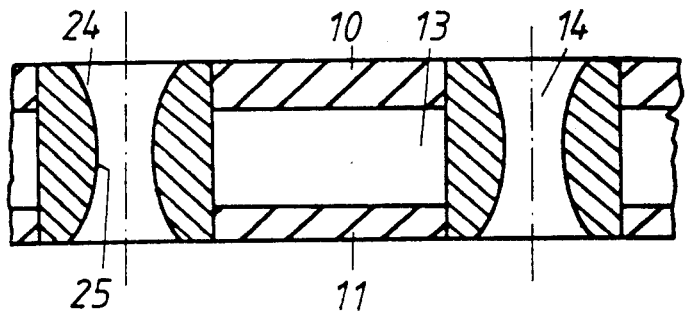

According to FIG. 4a, the spacers are rounded off at both ends, forming double-cone openings or passages (14) for the treating medium. While the effect of the rounding off of the edges, whereby, particularly, any particles of material that have got into the bore (14) are thrown out by the steam tension being increased at (25), can be achieved also by a unilateral cone formation (24) only, the additional rounding off also of the lower edge results in a considerably improved streaming in of the treating medium (e.g. steam) into the bore as a possible turbulence at the entry of the treating medium into the bore is counteracted.

Figure 4B:
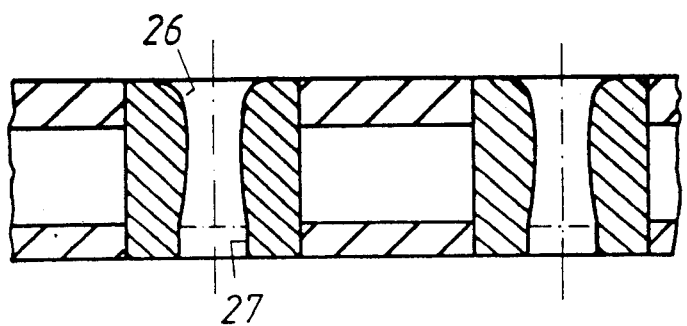

In the construction of the spacers according to FIG. 4b, the lower cone passes over into a cylindrical or even square or rectangular offset opening (27), while the radius of the upper cone (26) is somewhat reduced compared to that of (24) according to FIG. 4a. It is understood that the radius of the rounded portion or curvature according to FIG. 4b may also be equal to, or greater than, that of the rounded portion or curvature according to FIG. 4a.

Figure 4C:
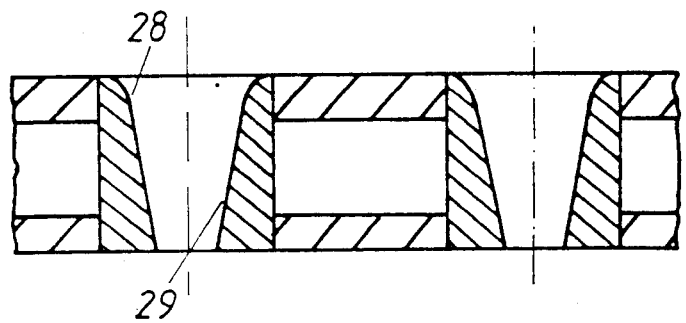

The bores (14) of the spacers (12), according to FIG. 4c, may also be of a form conically enlarging (29) from the bottom to the top and then ending also with a rounded-off edge (28).

Figure 4D:
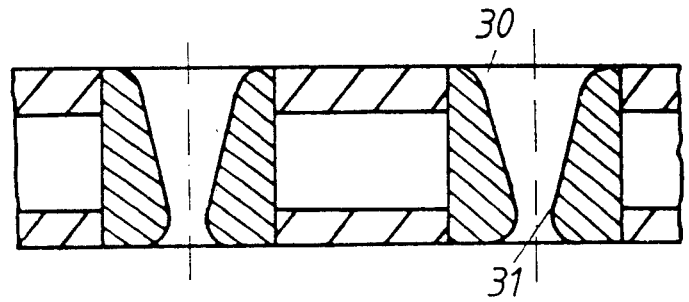

The formation of the bore (14) shown in FIG. 4d is in the manner of a Venturi tube with the edges (30) being rounded off as shown in FIG. 4c but the rounding-off of the lower edge (31) showing a reduced radius being shifted to the boundary zone of the lower-plate plane (plate (11) according to FIG. 2).

Figure 5A:
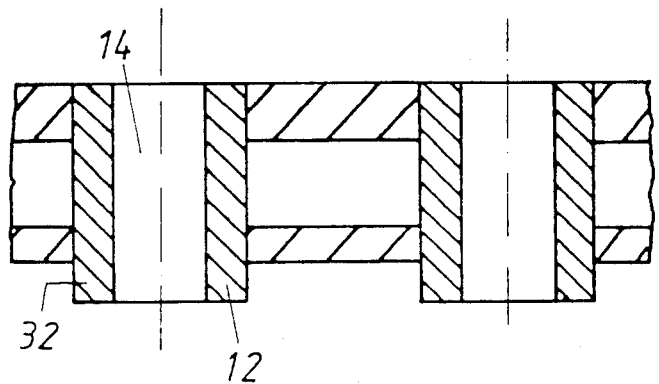
Figure 5B:
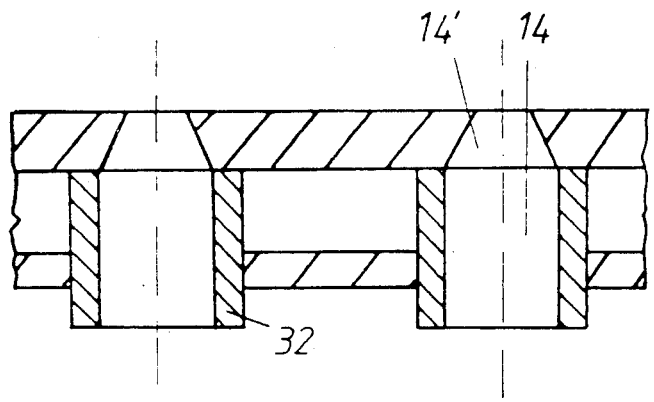

In the simplest case, according to FIGS. 5a, 5b, the spacers (12) are also imaginable in the form of tubular pieces the lower cylindrical ends of which extend slightly beyond (32) the lowermost plate boundary and into the next following stage, zone or or compartment (A, B. C, D). A special formation of these spacers may include a conical configuration (14') in the upper plate, whereby the effect of the spacers according to FIGS. 2 and 3, in connection with the extended end (32), is further enhanced.

It is understood that each of the above-described forms of the spacers (12) has a quite specific effect, serving to increase or maintain the steam tension at the exit from the bores (14), to prevent condensation of steam on or under the bottom plates (10, 11), to prevent congestions by material particles having got into the bores, to prevent the formation of channels within the material itself, to achieve uniform and optimally effective treatment of the material, to save steam or, generally, treating medium, to save electrical energy, particularly for the agitator drive, etc.

The constructions of the intermediate bottoms (compartment bottoms etc.) according to the invention may have widely varying dimensions, depending on the operating capacity and efficiency.

Generally and in practice, double bottoms according to FIG. 2 with the following dimensions have proved to be satisfactory—usual technical deviations or specific proportions being not excluded thereby—: a lower plate thickness (11) of (d)=approx. 8–15 mm, an upper plate thickness (10) of (b)=approx. 14–22 mm, a distance between the plates (c)=the height of the steam space (13) of approx. 12–30 mm, and an external (cylindrical) diameter (a) of the spacers or distance pieces of approx. 25–75 mm.

The distances between the individual spacers (12)—cf. FIG. 3—may be equal to, smaller or greater than the external cylindrical diameter (a) of the spacers. Generally, however, the distance (e) is equal to or greater than the external cylindrical diameter of the spacers. It has proved to be satisfactory to provide a distance (e) of e.g. 80 mm with a diameter (a) of e.g. 50 mm.

In the case of non-circular cylindrical, but square or polygonal spacers (12), the conditions are similar.

In the case of conical bores (14) according to FIGS. 2 or 3 with an upwardly tapering cone the inclination of the inner surface of the cone generally is in a range such that the ratio of the two taper bore areas (f):(g) is at about 2.0–1.5. This aperture ratio has proved to be useful e.g. in the treatment (desolventizing) of soy material with steam, particularly when the diameter of the bore in the region of the lower bottom plate (11) does not exceed the value of approx. 50 mm.

With a commercial apparatus of the above-defined type constructed as a whole in accordance with FIG. 1, having an overall useful height of approx. 5500 mm, an internal diameter of the cylinder (1)—FIG. 1—of approx. 3000 mm and three treatment zones (A, B, C), each zone having a separating steam-heated double bottom (3) according to the invention and including between 60 and 140 spacers or distance pieces (12) per m$^2$ of bottom area, corresponding to a cross-sectional proportion of all bores per bottom of 30–60% of the total bottom area, it is possible to process, that means, to desolventize in continuous operation e.g. 480 tons per 24 hrs. of residual material consisting of soybeans having been extracted with hexane.

The extraction residue, at the time of entering the treating apparatus, has e.g. a hexane content of approx. 2.1% by weight. Thus, about 10 tons of hexane have to be driven out per 24 hrs.

To this end, live steam of between 3 and 8 atmospheres excess pressure is introduced at the bottom of the apparatus into the lowermost compartment or zone (E)—FIG. 1—and passed on, uniformly distributed through the non-heated plain lowermost perforated bottom (4), into the lowermost treatment zone (D).

Due to the quite specific construction of the heated double bottoms (3) and the constant temperature thereof, undesirable steam condensation, steam pressure losses, channel formation or collapse of the steam-conditioned bubbling bed above the bottoms (3) will not occur anywhere in the region where material is being treated (zones A,B,C).

With a consumption of about 2.5 to 3.0 tons of steam per hour for the above-mentioned quantity of material (480 tons per 24 hrs.) the degree of drying (desolventizing) is considerably improved over conventional apparatus of this type. In this connection, the double bottoms according to the invention act constantly to redistribute the steam passing through the bottoms uniformly over the entire bottom cross-section in the individual zones (C–A). With the apparatus according to the invention, the material (in the special case described by way of example only: soy material) is uniformly and optimally subjected to treatment and freed of extractant to such a degree that the residual moisture remaining in the material is less than 0.01%. Compared to that, known apparatus of the type mentioned at the beginning, which do not have the features of the invention, provide average residual moisture contents of hardly less than 0.04%.

Similar results are noted in the treatment of solvent-wet rape seed. In the apparatus according to the invention, rape seed can be desolventized e.g. to a residual moisture of less than 0.05% whereas the lowest value obtained with conventional apparatus at best is about 0.20%. Besides these improvements of the product—the importance of a solvent-free or low-solvent extraction residue for the operating personnel, for the further handling or processing and, quite generally, for the conservation of the environment is hinted at only—, the power required e.g. for the agitator shaft of the apparatus is reduced considerably, in some known instances by as much as 50%, as the constant steam bubbling bed above the heated double bottoms is equivalent to a fluidized bed in the proper sense and thereby relieves the agitator shaft.

It is understood that by the foregoing the invention has been explained by way of example in its essential features only. It is, of course, possible also with the system according to the invention to feed in additional live steam below the double bottoms, as is described e.g. in German Pat. No. 2,608,712 for plain bottoms. It would also be possible—without exceeding or leaving the scope of the present invention—to introduce further additional steam through the agitator arms, in accordance with U.S. Pat. No. 2,695,459. But these known per se measures come into effect only in connection with the structure of the apparatus according to the present invention.

On principle, it is remarked that the claimed apparatus according to the invention has not been developed just for soybean or rapeseed material or is adapted specially and exclusively for natural substances, although the apparatus has so far been used and tried out preferably with such materials. Many processes of the chemical industry, such as drying, roasting or toasting, reactions with steam or vaporous or gaseous fluids with solids in countercurrent, separation of substances, evaporation etc., can be carried out successfully in the new apparatus.

What is claimed is:

1. Apparatus for the treatment of flaky or granulated material with gases or vapors in a continuous operation which comprises: a housing having an inlet at the upper portion thereof for introducing said material and an outlet at the lower portion thereof for removing the treated material, wherein said material falls downwardly by gravity; means for introducing said gases or vapors at the bottom of said housing in countercurrent relationship to said material; at least one perforated plate in said housing defining a treatment stage thereabove having discharge means for discharging said material from said treatment stage and defined by double bottoms having an upper and lower plate and having spacers therein substantially over the entire plate surface and including means for introducing a second vapor therebetween and means for removing said second vapor therefrom, wherein said spacers have a bore therein forming the perforations in said plate, the cross-section of said bore being substantially annular such that said gas or vapors may pass through said perforations and said material cannot pass through said perforations; a central shaft traversing said housing; agitator means above said perforated plate secured to said central shaft for transmitting horizontal motion to the material in said treatment stage; and a lowermost perforated plate in said housing for uniformly distributing said gases or vapor.

2. Apparatus according to claim 1 including three of said perforated plates defining three treatment stages.

3. Apparatus according to claim 1 wherein said gases or vapors is steam and said second vapor is steam.

4. Apparatus according to claim 1 wherein said bore has a conical configuration tapering from the lower double bottom plate to the upper double bottom plate.

5. Apparatus according to claim 1 wherein said bore is in the form of a double-cone-shaped passage having rounded-off edges and having the smallest cross-section in the middle of said double bottom.

6. Apparatus according to claim 1 wherein said bore in the region of the upper double bottom plate has a rounded-off, conical configuration and a cylindrical or rectangular offset opening in the region of the lower double bottom plate.

7. Apparatus according to claim 1 wherein said bore has an upwardly conically enlarging configuration in the region of the lower double bottom plate, said configuration changing in the region of the upper double bottom plate into conical rounded-off configuration.

8. Apparatus according to claim 1 wherein said bore has the configuration of a Venturi tube.

9. Apparatus according to claim 1 wherein said bore has the configuration of a cylindrical tube having an end portion extending beyond the lower double bottom plate.

10. Apparatus according to claim 1 wherein said bore has the configuration of a cylindrical tube terminating at the lower edge of the upper double bottom plate, wherein the bore within the upper double bottom plate has the configuration of an upwardly tapering cone.

11. Apparatus according to claim 1 wherein the lower double bottom plate thickness is 8-15 mm and the upper double bottom plate thickness is 14-22 mm.

12. Apparatus according to claim 1 including a vapor space between said upper and lower double bottom plates having a height of about 12-30 mm.

13. Apparatus according to claim 1 wherein said spacers have an external predominantly cylindrical diameter of about 25-75 mm.

14. Apparatus according to claim 1 wherein the double bottoms include between 60 and 140 of said bored spacers per $m^2$ of bottom area corresponding to a cross-sectional proportion of all bores of 30 to 60% of the total bottom area.

15. Apparatus according to claim 1 including means for imparting rotary movement to said central shaft and thereby imparting rotary movement to said agitator means secured thereto.

16. Apparatus according to claim 1 including an additional agitator means secured to said central shaft above the lowermost perforated plate.

17. Apparatus according to claim 2 including an agitator means above each of said perforated plates.

18. Apparatus according to claim 1 including a sight glass at the level of said treatment stage.

19. Apparatus according to claim 1 wherein said spacers connect the upper and lower double bottom plate and a vapor-tight vapor space is formed between said upper and lower double bottom plates.

20. Apparatus according to claim 1 wherein the distance between spacers is equal to or greater than the external diameter of the spacers.

* * * * *